United States Patent [19]

Gostomski

[11] Patent Number: 4,522,440
[45] Date of Patent: Jun. 11, 1985

[54] RAISABLE COVER

[76] Inventor: Richard B. Gostomski, 636 6th St., Owen, Wis. 54460

[21] Appl. No.: 512,839

[22] Filed: Jul. 11, 1983

[51] Int. Cl.³ .............................................. B60P 7/02
[52] U.S. Cl. .................................................. 296/100
[58] Field of Search ................ 296/100, 216; 220/315, 220/326

[56] References Cited

U.S. PATENT DOCUMENTS

| | | | |
|---|---|---|---|
| 2,886,375 | 5/1959 | Crawford | 296/100 |
| 3,012,814 | 12/1961 | Penner | 296/100 |
| 3,180,674 | 4/1965 | Pounds | 296/100 |
| 3,572,821 | 3/1971 | Van Antwerp | 296/137 |
| 4,083,596 | 4/1978 | Robertson | 296/100 |
| 4,142,760 | 3/1979 | Dockery et al. | 296/137 B |
| 4,181,351 | 1/1980 | Spanke | 296/100 |

Primary Examiner—Robert R. Song
Attorney, Agent, or Firm—Henderson & Sturm

[57] ABSTRACT

A raisable cover for use with box like containers such as pickup truck cargo beds. The apparatus includes a cover, a pair of parallel mounted based tubes, a plurality of securement units for connecting the base tubes to the container, two hinge and lock units for allowing the cover to be locked to the base tubes or to move hingably thereabout as desired, and two power assist units for urging the cover into an open position.

13 Claims, 10 Drawing Figures

RAISABLE COVER

TECHNICAL FIELD

This apparatus relates generally to raisable covers for box like enclosures, and more particularly to raisable covers for use with pickup truck cargo beds.

BACKGROUND ART

Various covers are provided in the prior art for use with box like enclosures. Many of these covers are designed for use with pickup truck cargo beds.

Some covers must be completely or substantially removed to gain access to the cargo bed. Others are very heavy and require strength and caution for safe and effective usage. Yet other covers do not adequately protect the interior of the cargo bed from liquids or particles in the atmosphere.

Many prior art covers are permanently hinged to the pickup truck, and hence can only be opened from one side. This can be both inconvenient and unsafe under certain circumstances. Further, many such covers are difficult to install and require modifying the sidewalls of the pickup truck cargo bed.

There exists a need for an easily used, safe and effective cover that may be easily lifted from either side of the pickup truck as desired. When not in a raised position, the cover should be capable of being locked in a closed position. When in an open position, the cover should include some mechanism for assuring this configuration until the operator desires to lower the cover. Such a cover should be easily installed and easily removed as desired.

DISCLOSURE OF INVENTION

These and other needs are substantially met by the instant invention. This invention comprises a raisable cover that includes two base tube assemblies, a plurality of securement units, two hinge and lock units and two power assist units.

The cover has sufficient width and length to completely cover the box container in question. In addition, the cover may have sidewalls to overlap the container and aid in preventing unwanted substances from entering the cargo area.

The base tube assemblies are disposed substantially parallel to one another and laterally across the cargo bed. The two base tubes serve to support the securement units, the hinge and lock units and the power assist units.

Each securement unit includes a container engaging member, a control member, a locking bracket and a pivot support member. The pivot support member connects to the underside of a base tube proximal an end thereof. The pivot support member then provides an opening through which the container engaging member may be disposed.

The locking bracket may be slidably disposed about the base tube somewhat proximal the pivot support member. The locking bracket includes an appendage disposed thereunder having a container engaging member slot formed therein for locking interaction with the container engaging member.

A base tube may be placed atop the sidewall of a pickup truck cargo bed and the container engaging member may be disposed beneath the sidewalls flange until it contacts a sidewall top plate. The locking bracket may then be moved to lock the container engaging member in place.

The container engaging member may be removed by appropriate manipulation of a control member, whereby the locking bracket may be removed from locking interaction therewith. The container engaging member may then be removed from interaction with the sidewall top plate.

Both ends of each base tube assembly have such a securement unit associated therewith. Therefore, both sides of each base tube may be securely mounted to the sidewalls of the cargo bed.

The hinge and lock units include a cover mounted bracket, a base tube mounted bracket, a rod and a rod control unit.

More particularly, each base tube has affixed to the end thereof a base tube mounted bracket. The cover has a cover mounted bracket attached thereto. The cover mounted bracket interacts with the base tube mounted bracket when the cover is in a closed position. Holes disposed through these brackets form a single rod passageway.

A rod mounted on the cover operably engages this passageway. The degree to which the rod interacts with these brackets may be regulated by a rod control unit. The rod may either be fully positioned within the brackets, thereby locking the cover on that side in a closed position and further serving as a hinge, or the rod may be removed sufficiently from the brackets to allow the cover to be lifted on that side.

The base tube assemblies also support the power assist units. Each power assist unit includes a biasing unit, a prop rod sliding bracket, a prop rod and a cover mounted prop rod bracket.

The biasing unit may be comprised of a normally expanded spring or the like that may be disposed about a base tube. A prop rod sliding bracket may then be slidably disposed about the base tube on both sides of the biasing unit.

A prop rod pivotally connects to each prop rod sliding bracket. The remaining end of each prop rod pivotally connects to the cover mounted prop rod brackets that are secured to the underside of the cover near the edges thereof.

The cover may be retained in a fully closed position by manipulating the rod control units to place the rods through both the cover mounted brackets and the base tube mounted brackets on both sides of the cover.

To lift one side of the cover, the operator manipulates the rod control unit for that side to remove the rod from locking interaction with these brackets. The cover may then easily be lifted on this side. The power assist units will operate to allow the prop rod sliding brackets associated with that side of the cover to move towards the sidewall as the biasing units urge them in this direction. This, in turn, will cause the prop rods to urge the cover upwardly. While this side of the cover raises, the remaining side will not raise because of the locking interaction between the rod and brackets associated therewith. The secured side of the cover will freely pivot about the rod and brackets, however.

The cover may be easily returned to the closed position by urging the prop rod sliding brackets back towards the closed position. The rod control unit may then be operated to secure this side of the cover in the closed position.

BRIEF DESCRIPTION OF THE DRAWINGS

These and other attributes of the invention will become more clear upon a thorough review and study of the following description of the best mode for carrying out the invention, particularly when reviewed in conjunction with the drawings, wherein.

BEST MODE FOR CARRYING OUT THE INVENTION

Figure 1:
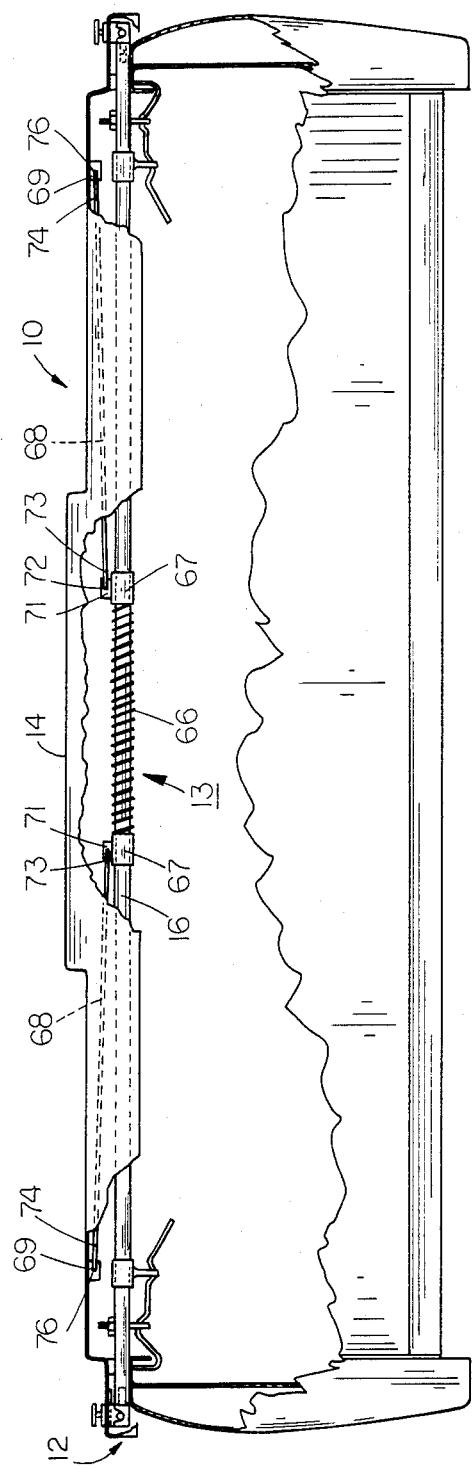
FIG. 1 provides a rear elevational view of the apparatus as positioned on a cargo bed with the cover in the closed position.

Referring now to the drawings, and in particular to FIG. 1, the apparatus of the invention may be viewed as depicted generally by the numeral 10. The apparatus (10) includes generally a plurality of securement units (11) (see FIG. 3), two hinge and lock units (12), two power assist units (13), a cover (14) and two base tubes (16). Each of these units will now be described in more detail in seriatim fashion.

The cover (14) may be comprised of any suitable lightweight material, such as aluminum, fiberglass or plastic. The cover (14) should have sufficient length and width to fully cover the containment box in question (in the embodiment depicted, a pickup truck cargo bed). In addition, the width of the cover (14) should be sufficient to allow the cover (14) to extend beyond the exact lateral dimensions of the cargo bed. The cover (14) may have sidewalls (17) to further assist in keeping water, dust and other possibly damaging materials from entering the cargo bed.

In the embodiment depicted, two base tubes (16) are provided. These tubes are positioned substantially parallel to one another and lateral span the cargo bed. These base tubes (16) may have a substantially square cross section (as perhaps best depicted in FIG. 6) and may be hollow.

Figure 3:
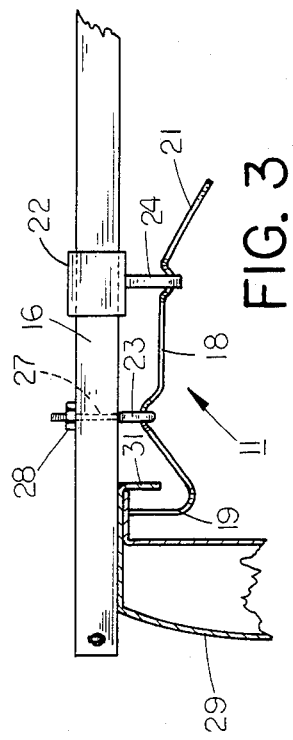
FIG. 3 provides an enlarged, rear elevational, detailed view of a securement unit.

Referring now to FIG. 3, a securement unit (11) will be described. The securement unit (11) includes a securement bar (18) that has a container engaging first end (19) and a control member second end (21) suitable for being gripped and manipulated by the human hand. The securement unit (11) further includes a locking bracket (22) and a pivot support member (23).

Figure 4:
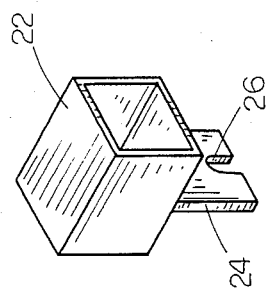
FIG. 4 provides an enlarged perspective view of a locking bracket.

Referring to FIG. 4, the locking bracket (22) may be comprised of a small tube having a substantially square cross section. The inner dimensions of the locking bracket (22) should be such that the locking bracket (22) can be slidably disposed about a base tube (16).

The locking bracket (22) further includes a flange (24) disposed therebelow. This flange (24) includes a securement bar slot (26) formed in its distal edge for purposes described below.

Referring back to FIG. 3, the pivot support member (23) may be comprised of an eyebolt. This eyebolt may be disposed through a hole (27) formed through the base tube (16) and secured by a nut (28) or the like.

The securement units (11) are disposed at each end of each base tube (16). These securement units (11) allow the base tubes (16) to be secured to the pickup truck sidewalls (29) as now described.

The pickup truck sidewalls (29) can be seen to include an inner flange (31). The securement bar (18) may be disposed through the pivot support member (23) and pivoted such that the container engaging portion (19) of the securement bar (18) becomes positioned behind the flange (31). The locking bracket (22) may then be moved along the base tube (16), and the control member (21) of the securement bar (18) may be manipulated to allow the securement bar (18) to become locked within the securement bar slot (26) of the locking bracket (22).

When locked in this configuration, the container engaging section (19) of the securement bar (18) effectively wedges the top of the sidewall (29) between itself and the base tube (16). Therefore, both base tubes (16) may be securely mounted at both ends to the top of the cargo bed by use of the securement units (11).

Figures 6, 10:
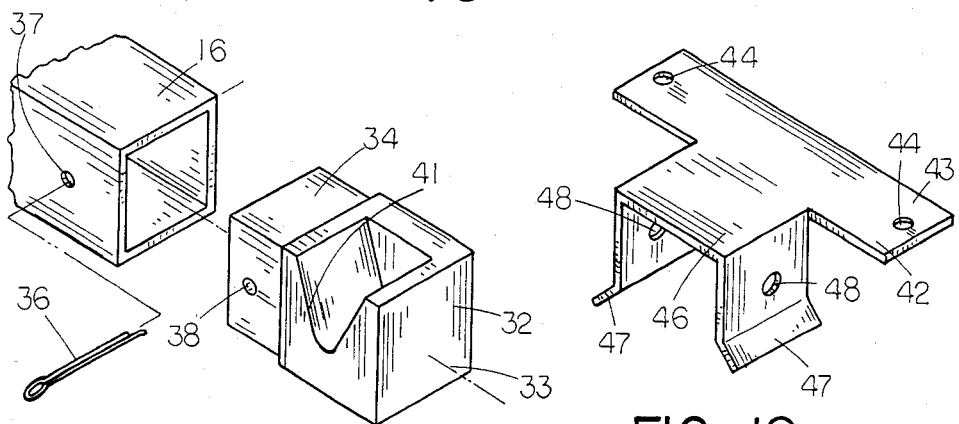
FIG. 6 provides a perspective view of a base tube mounted bracket in association with a base tube.
FIG. 10 provides a perspective view of the cover mounted bracket.
Figure 5:
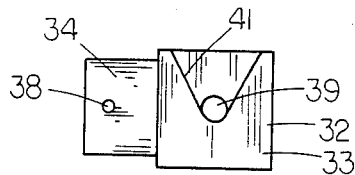
FIG. 5 provides a front elevational view of a base tube mounted bracket.

The hinge and lock units (12) will now be described. Referring to FIGS. 5 and 6, each hinge and lock unit (12) includes a base tube mounted bracket (32). This bracket (32) includes a first solid section (33) having a cross section substantially similar in exterior dimensions to the exterior cross section dimensions of the base tube (16). This bracket (32) further includes a second member (34) attached thereto for snug disposition within a base tube (16).

A retainer pin (36) may be utilized to attach the base tube mounted bracket (32) to the base tube (16). The retainer pin (36) may be disposed through holes (37) provided in the base tube (16) and through another hole (38) provided in the bracket (32).

The exterior segment (33) of the bracket (32) has a rod hole (39) disposed completely therethrough. This bracket (32) further includes a shaped cavity (41) formed therein to form a rod guide, the use of which will be made more clear below.

Referring to FIG. 10, the hinge and lock unit (12) also includes a cover mounted bracket (42). This bracket (42) includes a cover mounting surface (43) having two holes (44) disposed therethrough to facilitate attachment of the bracket (42) to the cover (14). A substantially U-shaped member (46) connects to the cover mounting member (43). The U-shaped member (46) has flanged outer ends (47) and holes (48) disposed through the sidewalls thereof for receiving a rod described below. The flanges (47) of the U-shaped member (46) facilitate disposition of the cover mounted bracket (42) about the base tube mounted bracket (32).

Figure 7:
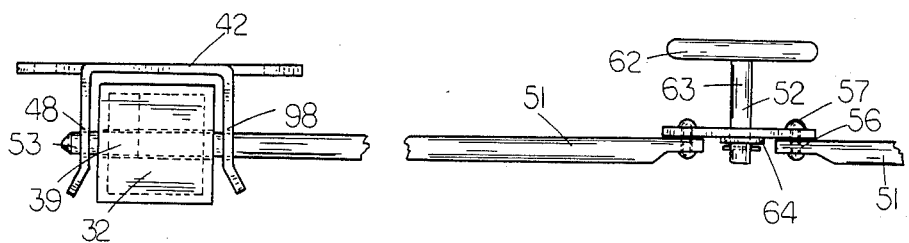
FIG. 7 provides a side elevational view of the hinge and lock unit in the locked position.
Figure 8:
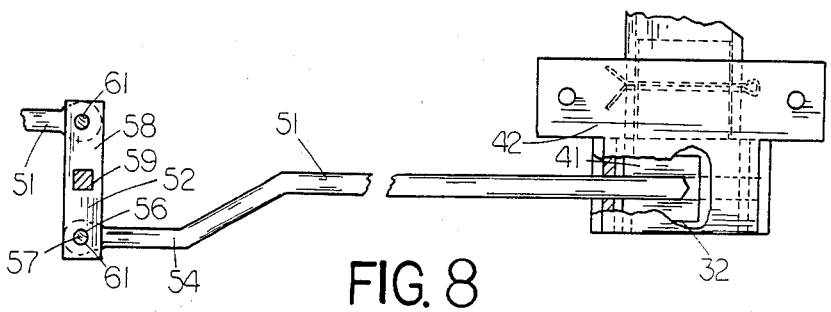
FIG. 8 provides a top plan view of the hinge and lock unit in the unlocked position.

Referring to FIGS. 7 and 8, each hinge and lock unit (12) further includes two rods (51) and a rod control unit (52).

The rods (51) are substantially linear members having a somewhat pointed first end (53) and a shaped second end (54). The second end (54) of each rod (51) further includes a hole (56) disposed therethrough for receiving a journal member (57).

The rod control unit (52) includes a lever arm (58) having a square shaped hole (59) disposed centrally therethrough and round holes (61) formed at either end thereof. The rods (51) may be connected to the lever arm (58) by disposing a journal member (57) through the holes provided in both the lever arm and the rods (56 and 61).

A keyed handle (62) having a square shaft (63) may be disposed within the square hole (59) provided therefor in the lever arm (58). The square shaft (63) may be secured in place by a locking member (64).

Referring to FIG. 8, it will be seen that in the unlocked position, the hinge and lock rod (51) penetrates only one side of the cover mounted hinge and lock bracket (42) and rests within the cavity (41) formed in the base tube mounted hinge and lock bracket (32). It should be understood that when so positioned, the cover mounted hinge and lock bracket (42), and hence the cover (14) may be lifted away from the base tube mounted hinge and lock bracket (32), and hence the cargo bed.

Referring to FIG. 7, the rod control unit (52) can be manipulated to insert the hinge and lock rod (51) completely through both holes (48) of the cover mounted hinge and lock bracket (42) and the hole (39) of the base tube mounted hinge and lock bracket (32). So configured, it should be understood that the cover mounted hinge and lock bracket (42), and hence the cover (14) cannot be lifted away from the base tube mounted hinge and lock bracket (32), due to the interaction of the hinge and lock rod (51) as described above.

It should further be understood that manipulation of the rod control unit (52) will result in either both hinge and lock rods (51) associated with that rod control unit (52) being in a locked position as depicted in FIG. 7, or both hinge and lock rods (51) being in an unlocked position as depicted in FIG. 8.

Figure 2:
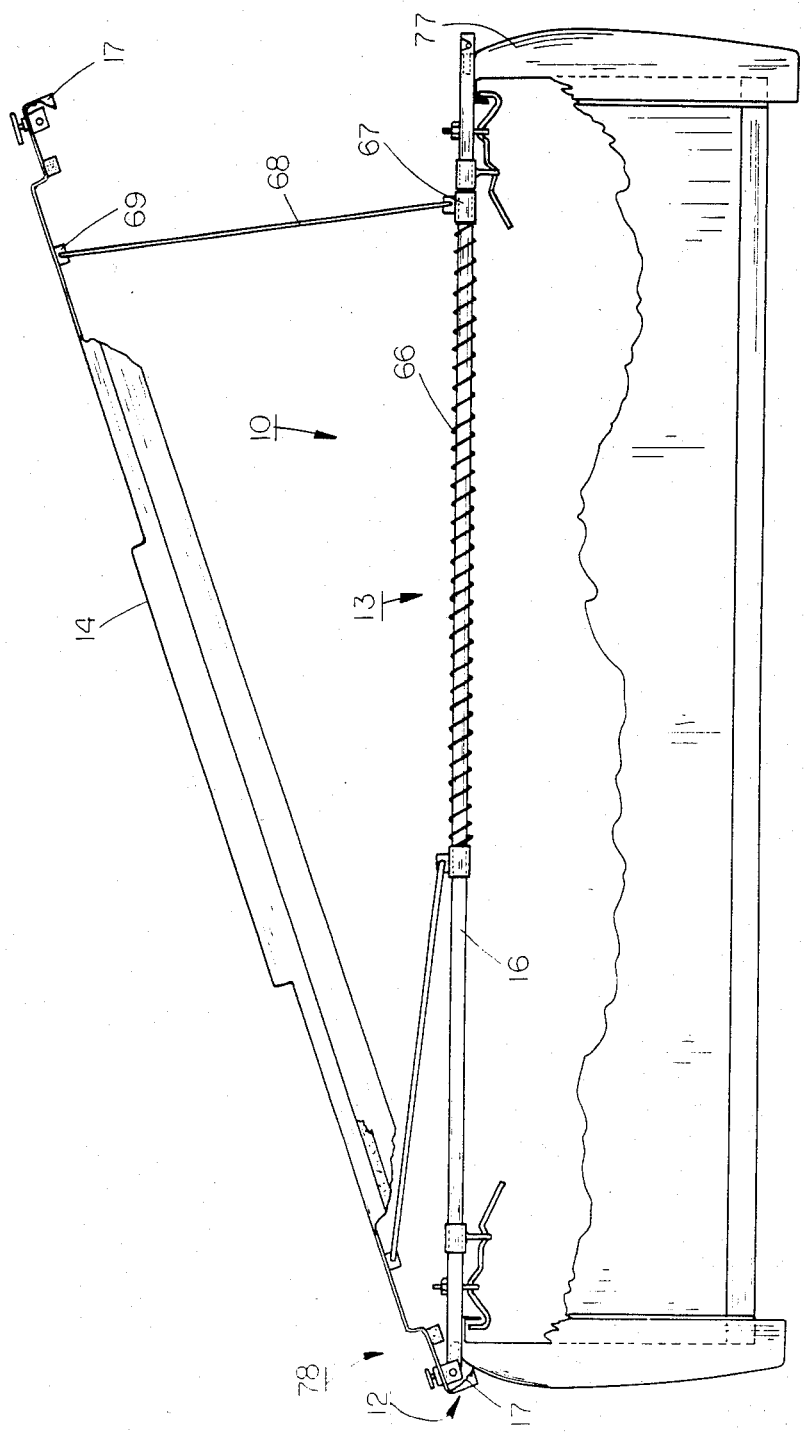
FIG. 2 provides a similar view of the apparatus with the cover in the raised position.

Referring to FIGS. 1 and 2, a power assist unit (13) will now be described. Each power assist unit (13) includes a biasing unit (66), a prop rod sliding bracket (67), two prop rods (68) and two cover mounted prop rod brackets (69).

The biasing unit (66) may be provided by a normally expanded spring that may be disposed about the base tube (16).

Both prop rod sliding brackets (67) are identical. Each may be comprised of a tubular member having a substantially square cross section and an inner configuration providing sufficient space to allow the prop rod sliding bracket (67) to be slidably disposed about the base tube (16). A flange (71) may be affixed to the upper side of each prop rod sliding bracket (67). This flange (71) may have a hole (72) disposed therethrough for rotatably receiving a prop rod (68).

The prop rods (68) are comprised of substantially elongated members having a first L-shaped end (73) for placement through the hole (72) provided in the prop rod sliding bracket (71) and a second L-shaped end (74) for similar interaction with the cover mounted prop rod brackets (69) disclosed below.

Figure 9:
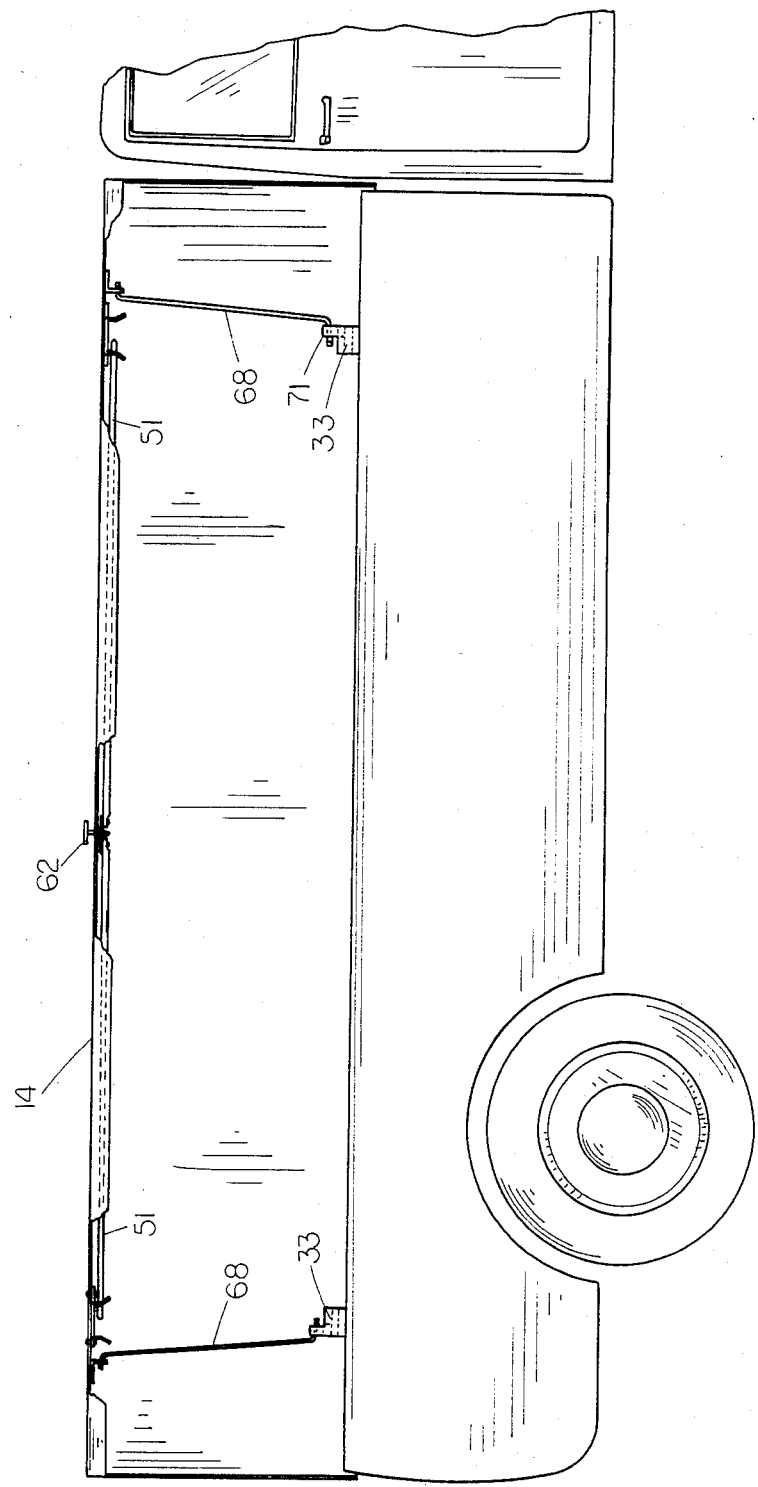
FIG. 9 provides a side elevational view of the figure depicted in FIG. 1.

The cover mounted prop rod brackets (69) may be substantially L-shaped (as depicted in FIG. 9). One leg of the L may include holes formed therethrough to facilitate securement of the cover mounted prop rod bracket (69) to the cover (14). The remaining leg of the L may hve a single hole (76) disposed therethrough to receive the prop rod (68).

Referring to FIG. 1, the power assist unit (13) operates by interaction between the biasing unit (66) and the prop rod sliding brackets (67). As one side of the cover (14) is lifted up, the prop rod sliding bracket (67) associated with that side will be urged by the biasing unit (66) towards that sidewall (77). As the prop rod sliding bracket (67) moves in this direction, the prop rod (68) connected to that prop rod sliding bracket (67) will rotate with respect to both the sliding bracket (67) and the cover mounted prop rod bracket (69) such that the prop rod (68) will move to completely support the cover (14) in an open position.

It should be understood that as the above occurs, the opposite side (78) of the cover (14) will rotate and hinge about the combined hinge and lock unit (12) for that side of the cover (14).

The cover (14) may be closed by reversing the above steps. It should be clear that either side may be lifted by appropriate manipulation of the rod control unit (52). Further, the entire apparatus (10) may be easily installed or removed from a particular vehicle by simple manipulation of the securement unit (11).

Obviously, many modifications and variations of the present invention are possible in light of the above teachings. It is therefore to be understood that, within the scope of the appended claims, the invention may be practised otherwise than as specifically described.

I claim:

1. In a raisable cover for a container, the container having at least a first and second sidewall disposed substantially opposite from one another and forming at least in part a storage area therebetween, the raisable cover including a cover that spans said storage area and having first and second sides disposed substantially opposite from one another, first hinge means operably connectable between the first side of said cover and the first sidewall of said container, second hinge means operably connectable between the second side of said cover and the second sidewall of said container, and prop means operably connected to said cover to assist in holding said cover in a raised position when so desired, an improvement comprising hinge and lock means for providing said first and second hinge means, said hinge and lock means including two rods movably mounted proximal to the first side of said cover and two rods movably mounted proximal to the second side of said cover, four container brackets mounted in a fixed position with respect to said container, each container bracket operably interacting with and disposed to receive one of said rods, and four cover brackets affixed to said cover, each cover bracket operably interacting with and disposed to receive one of said rods.

2. The improvement of claim 1 wherein each of said container brackets can be selectively aligned with each of said cover brackets, when said cover is in a closed position, said container brackets and said cover brackets being disposed for selectively receiving at least part of said rods therethrough, to prevent said cover from opening proximal said rods and for allowing said cover to move hingeably about said rods.

3. The improvement of claim 2 wherein:
  (a) each said cover bracket comprises at least two substantially parallel disposed flanges, each flange having a hole disposed therethrough; and
  (b) each said container bracket comprises a block having a hole disposed therethrough, said block being disposable between said flanges such that the holes disposed through said cover bracket and said container bracket may be aligned to receive a rod.

4. The improvement of claim 3 wherein said block further includes a cavity formed therein, said cavity including at least in part the hole disposed through said block, for use in guiding said rod into a locked position, and for not obstructing said rod when in an unlocked position such that said cover may be lifted away from said block.

5. In a raisable cover for a container, the container having at least a first and second sidewall disposed substantially opposite from one another and forming at least in part a storage area therebetween, the raisable cover including a cover that spans said storage area and having first and second sides disposed substantially opposite from one another, first hinge means operably connected between the first side of said cover and the first sidewall of said container, second hinge means operably connectable between the second side of said cover and the second sidewall of said container, and prop means operably connected to said cover to assist in holding said cover in a raised position when so desired, an improvement comprising power assist means operably connected to said cover and to said container to assist in urging said cover into an open position, said power assist means including:
  (a) a biasing unit operably mounted to said container;
  (b) at least one prop rod pivotally connected between said cover and said container and being operably and movably mounted with respect to said biasing unit, such that said biasing unit urges said prop rod towards a position that assists in urging said cover into a raised position;
  (c) a prop rod sliding bracket movably mounted with respect to said container and pivotally connected to said prop rod; and
  (d) a cover mounted prop rod bracket affixed to said cover and being pivotally connected to said prop rod.

6. The improvement of claim 5 wherein said biasing unit may be comprised at least in part by a normally expanded spring.

7. In a raisable cover for a container, the container having at least a first and second sidewall disposed substantially opposite from one another and forming at least in part a storage area therebetween, each sidewall further including a top wall and an inner flange disposed inwardly of said container with a cavity formed between each sidewall, top wall and inner flange, the raisable cover including a cover that spans said storage area and having first and second sides disposed substantially opposite from one another, first hinge means operably connectable between the first side of said cover and the first sidewall of said container, second hinge means operably connectable between the second side of said cover and the second sidewall of said container, and prop means operably connected to said cover to assist in holding said cover in a raised position when so desired, an improvement comprising: securement means for securing said raisable cover to said container, said securement means comprising:
  (a) a securement member having a container engaging member disposed thereon for holding the top wall of said container sidewall in contact with said raisable cover; and
  (b) lock means to selectively retain said container engaging member in a holding position.

8. The improvement of claim 7 and further including a pivot support member for pivotally supporting said securement member such that said container engaging member may be removed from holding interaction with the top wall such that said raisable cover can be selectively removed from said container.

9. The improvement of claim 8 and further including a control member disposed on said securement member for operable interaction with an operator's hand such that an operator can control the pivoting of said securement member about said pivot support member.

10. The improvement of claim 3 and further including:
  (a) a plurality of base tubes disposed substantially parallel to one another and disposed to span said storage area.

11. The improvement of claim 10, wherein said base tubes have substantially hollow ends formed thereof for allowing a rod receiving bracket to be at least partially disposed and retained therein.

12. The improvement in claim 11 wherein said improvement further includes having said securement means operably connected to each end of each said base tube for allowing each end of each said base tube to be selectively secured to said container.

13. The improvement of claim 12 and further including power assist means for urging said cover into a raised position, said power assist means including:
  (a) a biasing unit comprising a normally expanded spring that may be disposed about at least one of said base tubes;
  (b) at least one sliding prop rod bracket that may be slidably mounted about said base tube proximal said spring;
  (c) a cover mounted prop rod bracket secured to said cover; and
  (d) a prop rod pivotally connected to said cover mounted prop rod bracket and to said sliding prop rod bracket, such that said biasing unit may urge said sliding prop rod bracket away therefrom, thereby allowing said prop rod to pivot as between said sliding prop rod bracket and said cover mounted prop rod bracket to assist in urging said cover into a raised position.

* * * * *